(12) United States Patent
Ernsperger et al.

(10) Patent No.: US 9,885,858 B2
(45) Date of Patent: Feb. 6, 2018

(54) SURGICAL MICROSCOPY SYSTEM AND METHOD FOR OPERATING THE SAME

(71) Applicant: Carl Zeiss Meditec AG, Jena (DE)

(72) Inventors: Stefan Ernsperger, Ellwangen (DE); Hans-Juergen Seitz, Berg (DE)

(73) Assignee: Carl Zeiss Meditec AG, Jena (DE)

( * ) Notice: Subject to any disclaimer, the term of this patent is extended or adjusted under 35 U.S.C. 154(b) by 123 days.

(21) Appl. No.: 14/723,409

(22) Filed: May 27, 2015

(65) Prior Publication Data

US 2015/0346473 A1 Dec. 3, 2015

(30) Foreign Application Priority Data

May 27, 2014 (DE) .................. 10 2014 210 046

(51) Int. Cl.
*G02B 21/00* (2006.01)
*G02B 21/36* (2006.01)
*G02B 7/00* (2006.01)

(52) U.S. Cl.
CPC ....... *G02B 21/0012* (2013.01); *G02B 21/365* (2013.01); *G02B 7/001* (2013.01)

(58) Field of Classification Search
CPC .......................... G02B 21/0012; G02B 21/365
USPC .......................................................... 348/79
See application file for complete search history.

(56) References Cited

U.S. PATENT DOCUMENTS

| 8,563,912 B2* | 10/2013 | Mitzkus | G02B 21/241 250/201.3 |
| 2011/0216183 A1 | 9/2011 | Yokomachi | |
| 2012/0038761 A1* | 2/2012 | Sander | A61B 3/13 348/67 |
| 2012/0320186 A1* | 12/2012 | Urban | A61B 34/30 348/79 |
| 2015/0279032 A1* | 10/2015 | Hall | G06T 11/203 382/128 |

FOREIGN PATENT DOCUMENTS

DE 10 2009 037 018 A1 2/2011
WO 98/40025 A1 9/1998

OTHER PUBLICATIONS

English translation and German Office action dated Feb. 9, 2015 in German application No. 10 2014 210 046.1 on which the claim of priority is based.

* cited by examiner

*Primary Examiner* — Behrooz Senfi
(74) *Attorney, Agent, or Firm* — Walter Ottesen, P.A.

(57) ABSTRACT

A surgical microscopy system includes a surgical microscope with a control device and with focusable imaging optics for observing an operation field. The microscope is arranged on a stand with a base unit. The stand is embodied with linear drives and/or rotary joints in such a way that the surgical microscope is displaceable along three direction axes and rotatable about three axes of rotation relative to the base unit. For renewed focusing to a desired point, position and/or rotational sensors are assigned to each of the drives and/or joints for each of the direction axes and position and/or rotary angle sensors are assigned to each of the drives and/or joints for each of the axes of rotation and a focusing sensor for a focal point is assigned to the focusing imaging optics. A position and alignment of the microscope relative to the base unit and the focal point are storable.

14 Claims, 3 Drawing Sheets

SURGICAL MICROSCOPY SYSTEM AND METHOD FOR OPERATING THE SAME

CROSS REFERENCE TO RELATED APPLICATION

This application claims priority of German patent application no. 10 2014 210 046.1, filed May 27, 2014, the entire content of which is incorporated herein by reference.

FIELD OF THE INVENTION

The present invention relates to a surgical microscopy system and a method for operating the surgical microscopy system.

BACKGROUND OF THE INVENTION

Surgical microscopy systems are used, inter alia, in neurosurgical interventions in order, for example, to remove tissue afflicted by a tumor. Such a surgical microscopy system is distributed by the applicant under the trade name OPMI PENTERO 900. Here, the surgical microscopy system includes the actual surgical microscope with focusable imaging optics with preferably two eyepieces for stereo microscopy, corresponding lenses and objectives for magnified imaging of the actual operation field, wherein a focal point, that is, the distance between the focusable imaging optics and focal plane, at which a sharp optical image is obtained, is adjustable. Furthermore, provision can be made for illumination devices and/or data reflecting-in devices in order to superpose information directly into the field of view of the surgeon. Also, provision can be made for a second observation beam path for an assistant. Furthermore, the surgical microscopy system preferably comprises a camera in order to decouple, record and display an image of the operation field from an observation beam path. A display of a desired point in the operation field can be obtained with the aid of the focusable imaging optics. The actual surgical microscope is substantially freely movable in the operating theater by way of a stand with, in particular, a displaceable base unit. Here, the stand is embodied in such a way that the surgical microscope is freely movable relative to the base unit along all three direction axes (x, y, z) and likewise freely rotatable about three axes of rotation ($\alpha$, $\beta$, $\gamma$) such that the surgical microscope can be aligned in any spatial direction. Hence, the surgical microscope can be brought into a desired position and alignment in order to be able to view the operation field from a desired spatial direction. The operation field is then subsequently imaged at a desired point by way of the focusable imaging optics, wherein the focal plane has a specific distance from the imaging optics. The surgical microscopy system is also equipped with a control device which controls all functions. By way of example, this is a computer which is operated with appropriate software.

A problem that often occurs in neurosurgical interventions is that, macroscopically, for example, tumor tissue cannot be distinguished unambiguously from healthy tissue. To this end, one or more tissue samples, in particular from the edge regions of the tumor, are then removed during the operation or the intervention via a biopsy, known per se, in order to directly examine a tissue sample in a pathological laboratory and classify the tissue as to whether or not it is pathological. Likewise, microscopic images can be recorded via a confocal laser endoscope (abbreviated CLE) and evaluated in the pathology department. Depending on the result from the pathology department, the surgeon can then make a decision either to take further samples or to remove the region of tissue which is suspected of having a tumor or leave healthy tissue untouched. Since some time elapses between the removal of the tissue and the availability of the pathological examination result, a surgeon can, in the meantime, examine other points. However, once the result is available, it is desirable to return with the surgical microscope to exactly the same position from where this sample was removed. The point of removal of a tissue sample should therefore be markable. To this end, for example, Erainlab has introduced a so-called "Curve System" in order to mark this position by way of an image-controlled guidance. Such systems enable an assignment of the current positions of surgical instruments, for example, for the purposes of the biopsy, or of a focal point of the surgical microscope in space to diagnosis data generated pre-surgery via stereotaxy.

Furthermore, what is known from WO 98/40025 is that a biopsy positioning sensor acquires the points at which a biopsy is taken in the three-dimensional space of the operation region and optically reproduces a reference point in a three-dimensional virtual image, which can be fed to the surgeon via a display. Hence, the surgeon can, as it were, return with his surgical microscope to the point where the biopsy was taken. Then, the virtual image can be superposed on the real image from the surgical microscope.

SUMMARY OF THE INVENTION

Proceeding from this prior art, a person skilled in the art is presented with the problem of improving a surgical microscopy system to the extent that a retrieval of a point in the operation field can be carried out exactly. Furthermore, a method for operating the surgical microscopy system is provided.

The basic idea of the invention is to configure the surgical microscopy system to register the focal point of the focusable imaging optics, that is, the distance between the point in the operation field to be examined optically and the imaging optics. Here, the focal plane, that is, the distance from the imaging optics at which there is in-focus optical imaging, is set in relation to the point to be examined. A focus sensor serves to this end, the focus sensor being configured, for example, to register the focal point from registering the set magnification and registering how the lens systems of the imaging optics are set relative to one another. In principle, this can also be implemented by an autofocus, which is assigned to a camera which in turn registers an image that is decoupled from an observation beam path of the imaging optics. Furthermore, the exact positions of the surgical microscope relative to the base unit of the stand are determined in space by way of rotary angle sensors and position sensors, which are known from for example, industrial metrology, in the case of a surgical microscopy system as from, for example, DE 10 2009 037 018 A1. Here, the displacement in space along the directional axes (x, y, z) of the actual surgical microscope is implemented by the interaction of, for example, a linear drive in the form of a telescopic arm in the z-direction with two arms that are rotatable relative to one another and to the telescopic arm in the xy-plane. The alignment of the surgical microscope about the axes of rotation ($\alpha$, $\beta$, $\gamma$) is implemented by the interaction of three rotary joints. Here, it is clear that position sensors and/or rotational sensors or rotary angle sensors are respectively assigned to the linear drives and rotary joints in order to register and control the exact position and alignment of the surgical microscope. The position sensors for a linear drive can be path-length sensors or absolute position sensors which, for example, read the position on a scale. The sensors for the rotary joints are likewise those which either are able to register the whole rotary angle or, for example, determine the angular position on a degree scale. In particular, optical or electromagnetic processes, which are known from industrial metrology, are used as measurement principles. This means that the positions of the surgical microscope in space are uniquely registered on the basis of the positions along the three directional axes (x, y, z) and the rotation about three axes of rotation ($\alpha$, $\beta$, $\gamma$) relative to the position of the surgical microscopy system or the base unit thereof. By the additional registration of the focal point, it is possible to register the exact position of the point where the biopsy is taken in a virtual three-dimensional instrument coordinate system and to store this in an appropriately embodied storage device. This storage device is part of the control device of the surgical microscopy system known per se. However, since the arrangement of the surgical microscopy system does not change relative to the patient during the operation, a fixed relationship to the point where the biopsy is taken in the real three-dimensional space in the operating theater is ensured. From registering the positions of the surgical microscope, the respective angles of rotation and the focal point, also referred to as work distance, it is possible to establish the spatial relationship between the point where the biopsy is taken and the surgical microscopy system via a subsequent coordinate transformation, which, inter alia, is likewise known from industrial metrology and implementable in a computational device or control device embodied to this end. It is understood, naturally, that the relative arrangement of the surgical microscopy system or the base unit thereof and the operating field, that is, for example, the brain of a human, must not be changed during such an intervention. After the biopsy has been taken, the surgeon can examine a different region of the operation field and, once the biopsy results are available, return to the position of the stored coordinates, that is, position in space, rotary angle and focal point.

The surgical microscopy system and all the functions thereof are controlled in a manner known per se by foot switches and/or buttons or by actuating a touchscreen and a control device configured to this end in terms of hardware and/or software, which control device, in particular, also comprises a storage device.

Moreover, the mechanical configuration of the stand, by means of which the surgical microscope is displaced and twisted in space, is configurable as desired within the scope of the invention. By way of example, the displacement in space can be implemented by way of a vertical telescopic arm and a horizontal hinged arm and the twisting of the surgical microscope can be implemented by the coordinated actuation of three interacting rotary joints. It is possible, in particular, for the three axes of rotation ($\alpha$, $\beta$, $\gamma$) not to be perpendicular to one another but to be aligned skewed in relation to one another but nevertheless provide the option of aligning the surgical microscope in any spatial direction. Alternatively, the surgical microscope could, for example, be displaced in space only via three interacting linear drives. The scope of the invention also comprises the stand not being arranged on an in particular displaceable base unit, but rather being directly fastened to the wall or ceiling of an operating theater.

During an operation, a surgeon positions, twists and focuses the surgical microscope of the surgical microscopy system onto the point of the operation field at which a tissue sample is to be taken. This current position can then be stored in the storage device, for example controlled by an appropriately configured button or foot switch. Once the biopsy result is available, the surgeon can recall this position, for example by a further actuation of this or another button, and the three positions in space (x, y, z) and the respective rotary angles ($\alpha$, $\beta$, $\gamma$) and the focal point can be displayed to him by way of a data reflecting-in device known per se and he can then align and focus the surgical microscope accordingly and he has thus returned to the original sampling point in order to undertake further measures there.

Preferably, the surgical microscopy system is configured in such a way that it is equipped with linear actuators, rotary drives and the like, and also an autofocus. Therefore, when he wishes, as it were, to return to a previous sampling point, the surgeon is able to cause the surgical microscopy system to image exactly the original sampling point sharply in the focus of the surgical microscope by displacing, rotating and focusing the surgical microscope, for example by actuating an appropriately configured button. Subsequently, he can then, for example, take a further biopsy of the desired point.

Furthermore, the surgical microscopy system can be embodied in such a way that a desired point is marked in a video image which is decoupled from an observation beam path. By way of example, this is brought about by pressing an appropriately configured button. To this end, the required parameters, such as, inter alia, image scale and zoom of the video image, are registered by, for example, the control device and a relationship is established between this focal point, at which the marking was implemented, and the virtual instrument coordinate system. Subsequently, this marking, that is, for example, a colored spot, can be superposed at the location of the desired point in the video image and can be displayed on an external monitor. If there is a change in the position or alignment of the surgical microscope, the, for example, yellow spot in the video image is, as it were, updated. That is, the marking migrates with the video image and can also leave the field of view.

Additionally or alternatively, an object identification algorithm known per se can be used to store and superpose object tracking and position marking digitally in the video image. This means that the object, that is, for example, the point where the biopsy is taken, is registered by the algorithm and continued to be tracked when the surgical microscope is shifted or displaced in the video image. If a return to the original point is intended, the object identification algorithm can, as it were, retrieve this point in the video image. Then, the surgeon can return to this point on the basis of the position marking. By way of example, such an algorithm can be implemented in the control device in terms of hardware and/or software.

The return to the original point can be implemented either purely manually, by virtue of the surgeon, for example, manually actuating the superposed focus settings, position data and rotary angles using the surgical microscope, that is, by providing the respective control commands or displacing and rotating the surgical microscope by hand. The return can also be implemented wholly independently via appropriately actuated linear and rotational drives and via an autofocus. A mixed procedure is also possible, by virtue of, for example, the axes ($\alpha$, $\beta$, $\gamma$) being driven by motors and the spatial displacement (x, y, z) being implemented manually.

Furthermore, the surgical microscopy system can be equipped with a confocal laser endoscope (CLE). Then, if a CLE image is recorded at a desired position, this position is likewise stored in the virtual instrument coordinate system, for example in the storage device, in order subsequently to be able to return to this position. This position can likewise be marked in a video image. When a CLE is used in a surgical microscopy system, it is also conceivable to have a combined CLE control and position storage. To this end, a button on the handle of the microscope can for example be configured in such a way that a CLE image generates a CLE image when the button is actuated and provided with an ID. The associated position of the microscope is stored in the virtual instrument coordinate system and marked in the video.

It is clear that, in an operation field, a plurality of points can successively be approached, optionally marked and stored in the storage device. An identification code can also be assigned thereto, for example in order first to return to position 3 and only then to position 1. To this end, the corresponding positions in space, the respective rotations and the respective focal points are respectively stored in the storage device.

In addition or as an alternative to a display of marking of a desired point in a decoupled video image, this marking can also be superimposed into the field of view of the surgeon by way of an appropriately embodied data reflecting-in device. If the surgeon wishes to mark a desired point, he for example presses a correspondingly configured button. That is, he sees the real operation field and the marking of the desired point, for example a yellow spot. If the location of the surgical microscope changes relative to the operation field, the marking migrates with the desired point. Hence, the surgeon can immediately return to the desired position by way of this optical information. Here, numbering of various positions can, for example, also be superimposed.

Finally, what is proposed is that a stored point, at which, for example, a biopsy has been taken, can be approached by the surgical microscope from a different spatial direction, in particular from a reversed or opposite direction. In particular, this is implemented automatically by the surgical microscopy system. By way of example, if the biopsy results in a further surgical intervention being necessary at this position, the surgeon may consider it necessary to align the surgical microscope onto this position from a different spatial direction in order, for example, to have available better access with his surgical instruments. The surgeon can then prescribe the surgical microscopy system to approach this position from the desired spatial direction. Since the position is known in the virtual instrument coordinate system, an appropriate actuation can be implemented by an appropriate transformation in the (x, y, z) and ($\alpha$, $\beta$, $\gamma$) values and in the focal point. This can likewise be implemented in the control device in terms of hardware and/or software.

What is furthermore proposed is that marking of a desired point is generable with the aid of an external monitor. A partial beam can be decoupled from the observation beam path of the surgical microscope in a manner known per se and it can be fed to a camera in order to be reproduced on an external monitor or any other image display apparatus. Now, if the surgical microscope is aligned and focused onto a desired point in the operation region, this point is reproduced on the monitor. A surgeon or, for example, an assistant can now assign a marking to this desired point. If the monitor is a touch-sensitive screen according to the touch-screen principle, the surgeon or assistant can immediately touch that part of the screen surface at which the desired point is reproduced. Alternatively or additionally, this can also be implemented by, for example, displacement, controlled by an operating lever or by buttons, of a cross-hair pointer which is additionally superposed on the monitor and it can be triggered by, for example, pressing the lever. Subsequently, for example, a yellow spot can additionally be displayed on the monitor at the location of the desired point. Since the relevant imaging parameters such as zoom factor of the camera or of the image on the monitor, video scale or the like are known to the surgical microscopy system, the position of the marking in the virtual instrument coordinate system can be calculated on the basis of the image reproduced on the monitor. This is also true because the desired point is situated, at least in good approximation, in the focal plane of the focusable optics such that the actual distance of the desired point from the surgical microscope is known. If the alignment of the surgical microscope in relation to the desired point is then modified, this is also calculated by the control device of the surgical microscopy system and the marking migrates on the image on the monitor at the desired point.

In a method for operating a surgical microscopy system, use is made of a surgical microscope which is configured to register and store the position in space, the alignment and the focal point of a surgical microscope. Here, the surgical microscope is arranged at a stand, which in turn comprises a base unit, which can, for example, be displaceable. By way of a structure that, in principle, is configurable as desired, the stand is configured to displace the surgical microscope along three direction axes (x, y, z) and rotate the latter about three axes of rotation ($\alpha$, $\beta$, $\gamma$), wherein the position and alignment of the surgical microscope relative to the base unit are known as a result of, for example, location, rotation or position sensors at various mechanical components of the stand. Furthermore, the surgical microscope can be used to focus a desired point in a region to be observed with focusable imaging optics and the focal point can be stored. Therefore, the location of this point is known in a virtual, three-dimensional coordinate system of the surgical microscopy system and can be stored. By way of example, this storing in a storage device can be implemented by actuating a button or a foot switch. Subsequently, the user can align and focus the surgical microscope to a different point of the region to be observed. If the user wishes to see the first observed point at a later time, the surgical microscopy system is configured to—preferably independently—displace the surgical microscope back to the original position, rotate it into the original alignment and set the original focal point. By way of example, an appropriately configured button or a foot switch of the surgical microscopy system can be actuated to this effect. Use is made of the stored data and, for example, in principle arbitrary actuators for the mechanical components of the stand are actuated accordingly, just like the focusable imaging optics. Consequently, the user can once again see the region to be observed if, for example, he is of the opinion not to have seen a detail during the preceding observation. The—in particular independent—return to the first point ensures that there is refocusing on exactly this first point.

In particular, the user can store the observed point and then perform an in principle arbitrary manipulation at this point. Subsequently, the user can view a different point in the region to be observed and then, as it were, return to the first point in order to view it again. By way of example, this manipulation could be a biopsy or the like. Consequently, the biopsy can be performed, a different point can be observed and, once the result of the biopsy is available, the sampling point can be approached again in an exact manner.

The surgical microscopy system is preferably embodied in accordance with the above-described surgical microscopy system.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
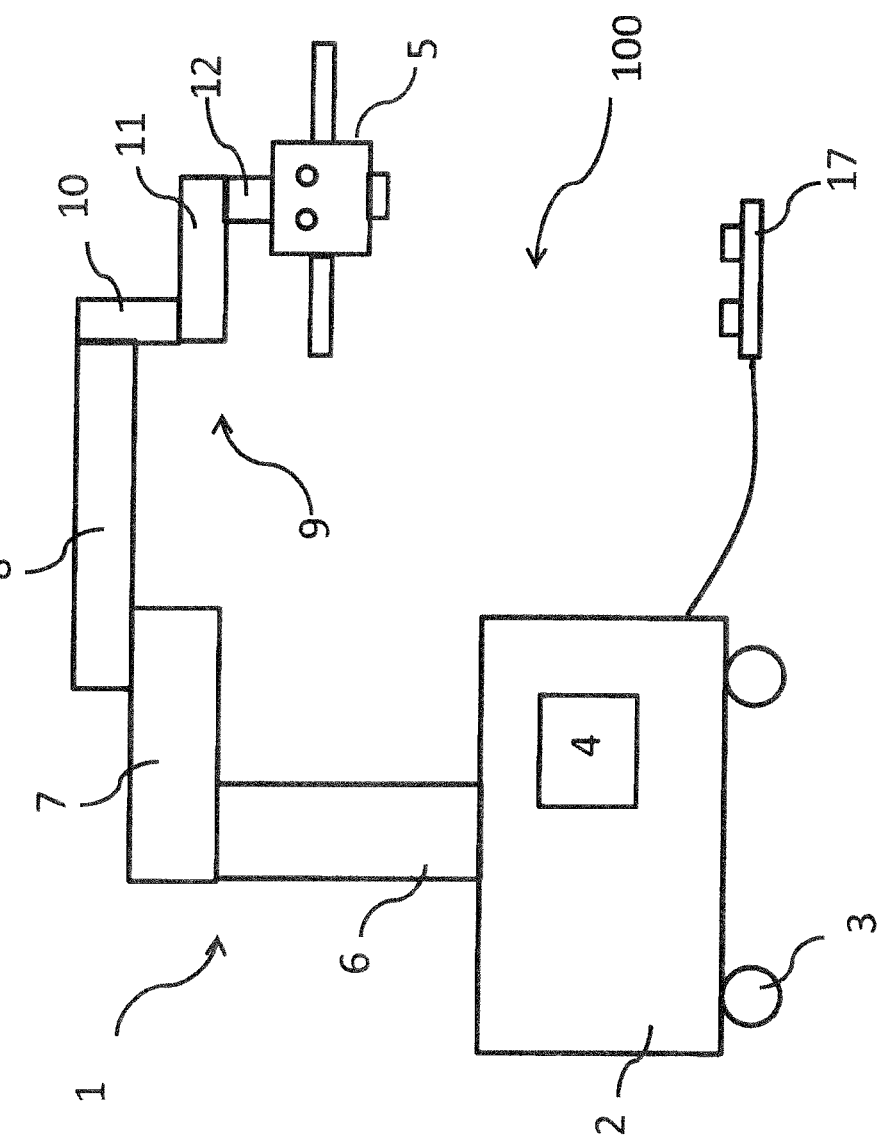
FIG. 1 shows a surgical microscopy system.

FIG. 1 depicts, in a purely schematic manner, a surgical microscopy system 100, as is distributed by the applicant, for example as OPMI PENTERO 900. Here, reference is explicitly made to the fact that the surgical microscopy system 100 according to the invention can be embodied in accordance with this OPMI PENTERO 900. It comprises a stand 1 with a base unit 2. The base unit 2 is freely displaceable in the operating theater, for example by way of rollers or wheels 3. The latter are lockable in order, during the operation, to ensure an unchanging arrangement in relation to an operating table or in relation to an operation field 16 to be examined. All electronic components for operating the surgical microscopy system 100, such as the control device, storage device 4 or other computational devices, are preferably arranged in the base unit 2. A monitor can also be provided on the base unit 2 in order to display the image of an operation field 16, which was decoupled by a camera from an observation beam path 14 of the actual surgical microscope 5. By way of example, the surgical microscopy system 100 is controlled by buttons, a foot switch 17 or a touchscreen.

The stand 1 comprises a height-adjustable telescopic arm 6, a first arm 7 and a second arm 8, on which a suspension 9 is arranged in turn. The suspension 9 in turn comprises a connection 10, a swivel arm 11 and a holding piece 12, with the actual surgical microscope 5 being arranged on the holding piece 12.

Figure 2:
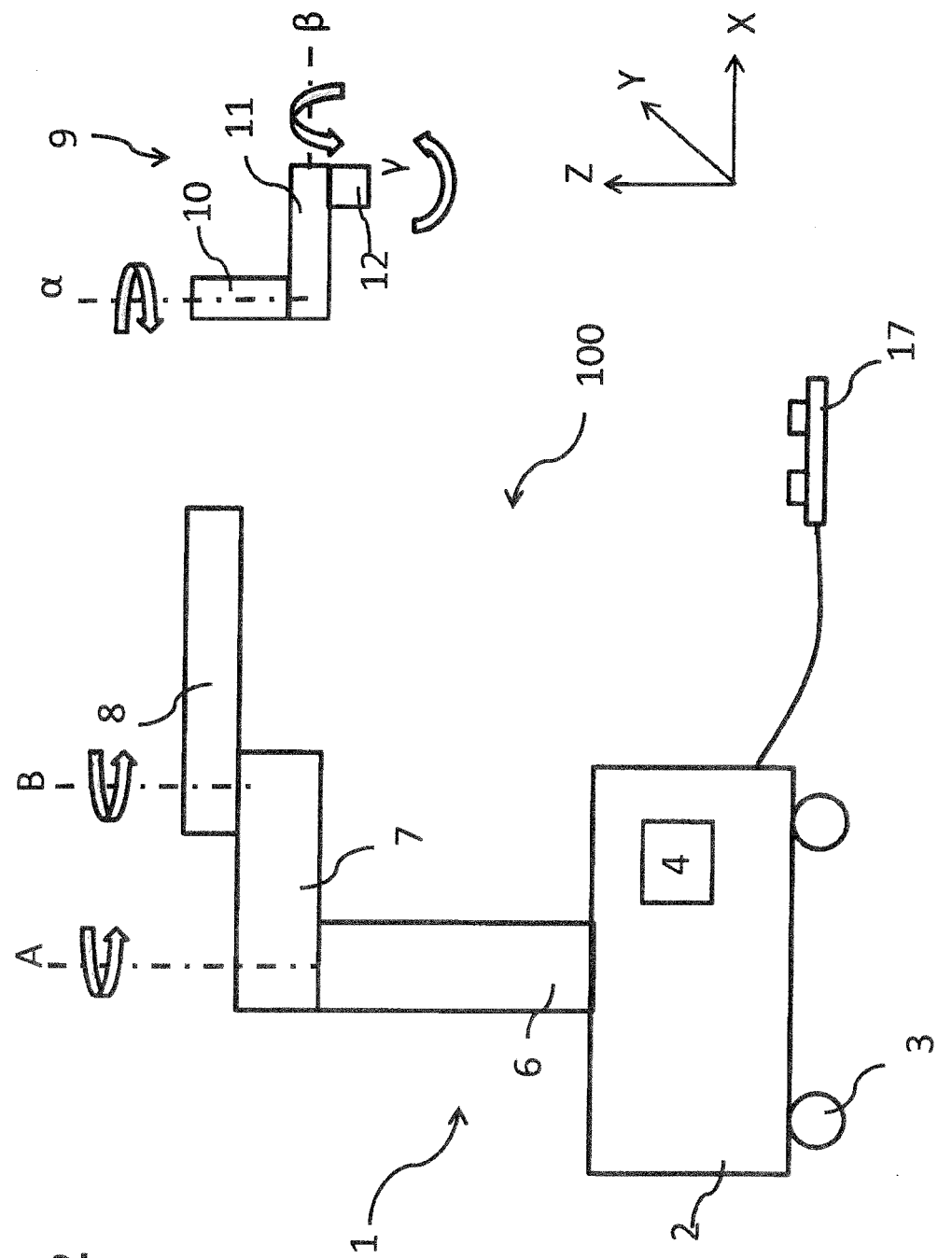
FIG. 2 shows the degrees of freedom of the surgical microscopy system.

FIG. 2 elucidates the movability of the stand 1. At one end, the first arm 7 is mounted at the upper end of the telescopic arm 6 in a manner rotatable about an axis A. At its other end, an end of the second arm 8 is in turn rotatably mounted about an axis B that is parallel to the first axis A. Therefore, the first arm 7 and second arm 8 form a hinged arm, which allows the surgical microscope 5 to be brought to a desired position in the xy-plane, with the surgical microscope 5 not being depicted in FIG. 2. Furthermore, the telescopic arm 6 enables an arbitrary displacement in the z-direction. Therefore, the surgical microscope 5 is freely movable along all direction axes (x, y, z).

By contrast, the suspension 9 allows the rotation of the surgical microscope 5 about the three axes of rotation ($\alpha$, $\beta$, $\gamma$). To this end, the connection 10 is mounted on the second arm 8 in a manner rotatable about the axis of rotation $\alpha$, that is, the connection 10 is rotatable about the longitudinal axis thereof. The swivel arm 11 in turn is mounted on the connection 10 in a manner rotatable about the longitudinal axis thereof or about the axis of rotation $\beta$. Finally, the holding piece 12 is in turn rotatably mounted on the swivel arm 11 in such a way that it is rotatable about an axis of rotation $\gamma$ that extends perpendicular to the plane of the drawing. The surgical microscope 5 can be aligned in any direction by a coordinated actuation of the three axes of rotation ($\alpha$, $\beta$, $\gamma$).

It is understood that all telescopic devices or rotatable mounts are respectively equipped with position and/or rotary angle sensors in order to be able to register the respective position or rotary position. These sensors transmit the respective information thereof via data lines (not depicted here) to a storage device 4 of the surgical microscopy system 100. From this, a control device (not depicted here) establishes the position and alignment of the surgical microscope 5 in space. Furthermore, it is possible to provide actuators such as linear or rotatable drives, which are fed by power lines (not depicted here). Consequently, the surgical microscope 5 can be displaced to a desired position in space and can be rotated into the desired direction.

Figure 3:
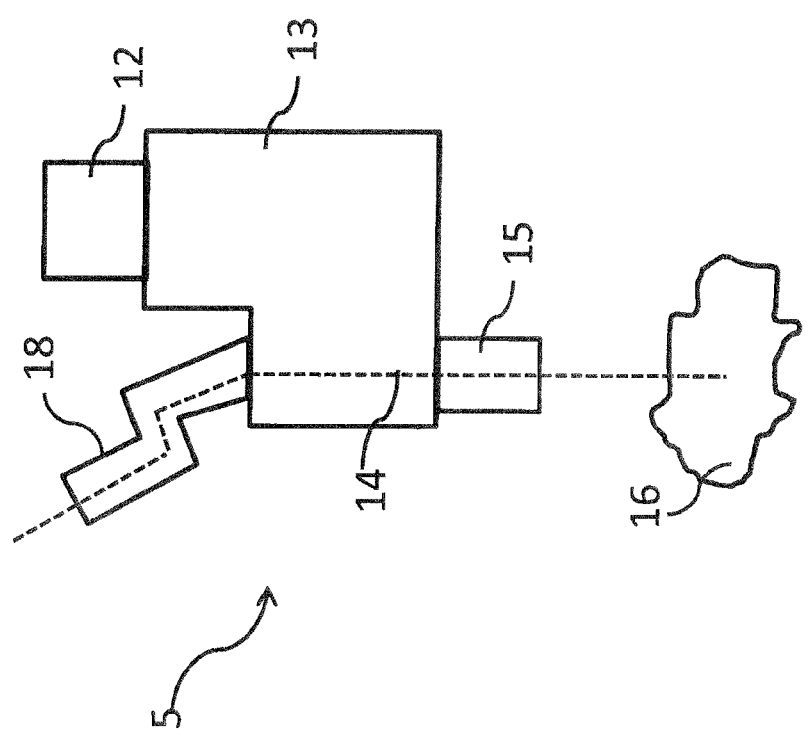
FIG. 3 is a schematic surgical microscope.

FIG. 3 schematically depicts the surgical microscope 5, which is held on the stand 1 (not depicted here) of the surgical microscopy system 100 via the holding piece 12. The surgical microscope 5 includes a main body 13, in which, inter alia, an illumination device, a data reflecting-in device and a camera for decoupling a video image from the observation beam path 14 may be provided. The surgeon observes the operation field 16 through a stereo binocular tube 18. Furthermore, provision is made for focusable imaging optics 15 in order to image the operation field 16 or a specific point in the operation field 16 in focus. Here too, provision is made for data and power lines (not depicted here) in order, for example, to transmit the focal point of the focusable imaging optics 15 to the storage device 4 or in order to set the focal point as desired.

If the surgeon has now aligned the surgical microscope 5 in the desired position in space and rotated it into the desired direction, he can align the focusing imaging optics 15 to focus onto a point in the operation field 16, that is, with a known focal point. This is also referred to as a work distance and specifies the distance between the focusing imaging optics 15 and a focal plane, at which an in-focus image of the observed point in the operation field 16 is obtained. By way of the position and alignment of the surgical microscope 5 and by way of the focal point, the examined point is known and stored in the virtual three-dimensional instrument space of the surgical microscopy system 100. Subsequently, it is possible to carry out a biopsy and align the surgical microscope 5 onto a different point in the operation field 16. Once the biopsy results are available, the surgical microscope 5 can—preferably independently—be displaced, aligned and focused such that the surgeon can once again observe exactly the same point in the operation field 16 through the focusing imaging optics 15 and take further measures there.

It is likewise possible for a user to align the surgical microscope 5 at the desired position in space and rotate it into the desired position and align the focusing imaging optics 15 to focus onto a point in a region to be observed, that is, with a known focal point. This is also referred to as a work distance and specifies the distance between the focusing imaging optics 15 and a focal plane, at which an in-focus image of the observed point in the region to be observed is obtained. By way of the position and alignment of the surgical microscope 5 and by way of the focal point, the examined point is known and stored in the virtual three-dimensional instrument space of the surgical microscopy system 100. Subsequently, it is possible to carry out an in principle arbitrary manipulation and align the surgical microscope 5 onto a different point in the region to be observed. Subsequently, the surgical microscope 5 can—preferably independently—be displaced, aligned and focused such that the user can once again observe exactly the same point in the region to be observed through the focusing imaging optics 15, in order, for example, to observe further details there.

It is understood that the foregoing description is that of the preferred embodiments of the invention and that various changes and modifications may be made thereto without departing from the spirit and scope of the invention as defined in the appended claims.

LIST OF REFERENCE SIGNS

1 Stand
2 Base unit
3 Wheel
4 Storage device
5 Surgical microscope
6 Telescopic arm
7 First arm
8 Second arm
9 Suspension
10 Connection
11 Swivel arm
12 Holding piece
13 Main body
14 Observation beam path
15 Focusable imaging optics
16 Operation field
17 Foot switch
18 Stereo binocular tube
αβγ Axes of rotation
xyz Direction axes
A,B Axes of rotation
100 Surgical microscopy system

What is claimed is:

1. A surgical microscopy system comprising:
a surgical microscope defining an observation beam path and having a control unit and focusable imaging optics for observing an operation field during a surgical procedure;
a stand having a base;
said surgical microscope being arranged on said stand;
said stand further having at least one of linear drives and rotary joints configured to enable said surgical microscope to be displaceable along three direction axes (x, y, z) and rotatable about three axes of rotation (α, β, γ) relative to said base;
each of said at least one of the linear drives and the rotary joints having at least one of position sensors and rotary angle sensors assigned thereto for each of said three direction axes (x, y, z);
each of said at least one of the linear drives and the rotary joints having at least one of position sensors and rotary angle sensors assigned thereto for each of said three axes of rotation (α, β, γ);
a focusing sensor for a focus point assigned to said focusable imaging optics; and,
a storage device configured to store a position and alignment of said surgical microscope relative to said base as well as to store said focus point of said focusable imaging optics at said position and alignment so as to permit said surgical microscope to return to the stored position and alignment and the stored focus point after being displaced therefrom during the course of the surgical procedure.

2. The surgical microscopy system of claim 1, wherein the surgical microscopy system is configured to automatically assume a position in space stored in said storage device with an appropriate alignment and focus setting.

3. The surgical microscopy system of claim 1, wherein said surgical microscope is configured to mark a desired position in a video image decoupled from said observation beam path.

4. The surgical microscopy system of claim 1, wherein said control unit incorporates an object recognition algorithm for storing and superposing object tracking and position marking digitally in a video image decoupled from said observation beam path.

5. The surgical microscopy system of claim 1, wherein the surgical microscopy system is at least one of manually and automatically operable.

6. The surgical microscopy system of claim 1 further comprising a confocal laser endoscope.

7. The surgical microscopy system of claim 1, wherein said storage device is configured to store a plurality of positions and alignments of said surgical microscope relative to said base and corresponding focus points of said focusable imaging optics.

8. The surgical microscopy system of claim 1 further comprising a data reflecting-in device configured to superpose a marker at a desired location.

9. The surgical microscopy system of claim 1, wherein said control unit is configured to be able to approach a stored position from a different spatial direction.

10. The surgical microscope of claim 1 further comprising:
an external monitor configured to help generate a marking at a desired position;
a camera; and,
said surgical microscope being configured to provide a partial beam thereof decoupled from said observation beam path and supplied to said camera.

11. A method for operating a surgical microscopy system having a surgical microscope defining an observation beam path and having a control unit and a focusable imaging optics for observing an operating field during a surgical procedure, the surgical microscope being arranged on a stand having a base, wherein the stand is configured to displace the surgical microscope in three direction axes (x, y, z) and to be rotatable about three rotation axes (α, β, γ) relative to the base, the focusable imaging optics having a focusing sensor associated therewith for a focus point assigned to the focusable imaging optics, and a storage device configured to have a position and alignment of the surgical microscope relative to the base as well as a focus point of the focusable imaging optics stored thereon, the method comprising the steps of:
focusing the surgical microscope on a desired location in an area to be viewed;
storing the current position of the surgical microscope relative to said base and alignment and storing the focus point of the focusable imaging optics at said position and alignment;
aligning and focusing the surgical microscope on a different location in the area to be viewed; and,
moving the surgical microscope back to the originally stored position, alignment and focus point during the course of the surgical procedure.

12. The method of claim 11 further comprising the step of performing a manipulation at the stored position after said storing of the current position, alignment and focus point and prior to said aligning and focusing the surgical microscope on a different location in the area to be viewed.

13. The method of claim 11, wherein the stand has at least one of linear drives and rotary joints configured to enable said surgical microscope to be displaceable along said three direction axes (x, y, z) and rotatable about said three axes of rotation (α, β, γ) relative to said base; each of said at least one of linear drives and rotary joints having at least one of position sensors and rotary angle sensors assigned thereto for each of said three direction axes (x, y, z); and, each of said at least one of linear drives and rotary joints having at least one of position sensors and rotary angle sensors assigned thereto for each of said three axes of rotation ($\alpha$, $\beta$, $\gamma$).

14. The method of claim 11, wherein the surgical microscope is moved back to the originally stored position automatically.

* * * * *